(12) United States Patent
Godet (10) Patent No.: US 7,806,469 B2
(45) Date of Patent: Oct. 5, 2010

(54) SWINGING AND SLIDING ROOF DEVICE FOR MOTOR VEHICLES

(75) Inventor: Thierry Godet, Nueil-les-Aubiers (FR)

(73) Assignee: Webasto A, Stockdorf (DE)

( * ) Notice: Subject to any disclaimer, the term of this patent is extended or adjusted under 35 U.S.C. 154(b) by 97 days.

(21) Appl. No.: 11/577,756

(22) PCT Filed: Oct. 24, 2005

(86) PCT No.: PCT/DE2005/001907

§ 371 (c)(1), (2), (4) Date: Jan. 12, 2009

(87) PCT Pub. No.: WO2006/042539

PCT Pub. Date: Apr. 27, 2006

(65) Prior Publication Data

US 2009/0152906 A1    Jun. 18, 2009

(51) Int. Cl.
*B60J 7/053* (2006.01)
(52) U.S. Cl. .............................. 296/216.03; 296/216.05; 296/222
(58) Field of Classification Search ................................ 296/216.02–216.05, 222
See application file for complete search history.

(56) References Cited

U.S. PATENT DOCUMENTS

| | | | | | |
|---|---|---|---|---|---|
| 4,407,541 | A | * | 10/1983 | Boots | 296/216.03 |
| 4,609,222 | A | * | 9/1986 | Boots | 296/218 |
| 4,678,228 | A | * | 7/1987 | Boots | 296/216.03 |
| 4,747,637 | A | * | 5/1988 | Lenoir et al. | 296/218 |
| 5,058,947 | A | * | 10/1991 | Huyer | 296/216.03 |
| 6,305,740 | B1 | * | 10/2001 | Staser et al. | 296/222 |
| 6,457,769 | B2 | | 10/2002 | Hertel et al. | |
| 6,688,682 | B2 | | 2/2004 | Arthur et al. | |
| 7,367,615 | B1 | * | 5/2008 | Fallis et al. | 296/220.01 |

FOREIGN PATENT DOCUMENTS

| | | | |
|---|---|---|---|
| EP | 0 371 523 A1 | | 6/1990 |
| FR | 2 695 596 A1 | | 3/1994 |
| FR | 2 825 062 A1 | | 11/2002 |
| JP | 361018517 | * | 1/1986 |
| JP | 403169740 | * | 7/1991 |

* cited by examiner

*Primary Examiner*—Dennis H Pedder
(74) *Attorney, Agent, or Firm*—Roberts Mlotkowski Safran & Cole, P.C.; David S. Safran

(57) ABSTRACT

A sliding roof device (1) which is designed to close an opening (104) in the upper part of a motor vehicle body (101), the sliding roof device (1) having a pane (10) which is mounted for displacement between a closed position in which it closes the opening (104), and an opened position in which the pane (10) is at least partially spaced away from the opening (104). The movable pane 10 has a front part (11) which is mounted to rotate about a transverse axis (A) which is mounted for displacement in essentially translational motion. The rear part (12) of the movable pane (10) is pivotally mounted rotate about a transverse axis (B) while being swung about a stationary axis (C).

25 Claims, 7 Drawing Sheets

SWINGING AND SLIDING ROOF DEVICE FOR MOTOR VEHICLES

BACKGROUND OF THE INVENTION

1. Field of Invention

The invention relates to a sliding roof device which is designed to close an opening made in the upper part of the body of a motor vehicle.

2. Description of Related Art

The invention can be used especially advantageously, but not exclusively, in the area of commercial vehicles.

Vehicles are known with a rear roof part which can be opened via a sliding roof device which is inserted into the upper part of the body. This sliding roof device generally has the form of a pane which is conventionally called a lifting cover and which is mounted to be able to move relative to the opening made in the upper part of the body of the motor vehicle between a closed and an opened position. The whole is arranged such that the movable pane is able, on the one hand, to close the opening in the closed position, and on the other hand, the is able to extend to a position which at least partially clears the opening in the opened position.

In the sliding roof devices known from the prior art, especially those should be mentioned in which motion of the movable pane takes place by motor power.

The use of motors enables design of systems with motions of displacement of the movable pane which are relatively complex to guide. In practice, these movements are almost always complex. In fact, sliding roof devices of this type are generally designed such that the movable pane, on the one hand, can be positioned flush in the closed position, and on the other hand, can extend parallel above the roof head liner in the opened position.

However, this type of sliding roof device has the disadvantage that it is very expensive as a result of the very great structural complexity which is dictated by the motor drive of the movable pane. This configuration, in fact, requires installation of motors, driving means such as, for example, cables and other deflection rolls, and guide means such as, for example, slide rails. Ultimately, a sliding roof device with a motor-driven pane is expensive and offers reliability which can be unsatisfactory; this makes its use less advantageous, for example, in commercial vehicles.

To address this difficulty, of course, it is possible to use a sliding roof device with purely manual operation in the traditional manner. In particular, a system is intended which has a half opening pane; this currently constitutes the most common configuration in commercial vehicles.

However, this type of sliding roof device is not free of disadvantages either, since rotary installation of the movable pane triggers an especially large requirement for space in the opened position. This problem is otherwise so pronounced that the whole is generally designed such that the rotary pane can be unhinged. But, specifically, this means that the problem of the space requirement is simply shifted since it is accordingly necessary to configure the stowage of the removable element.

SUMMARY OF THE INVENTION

Accordingly, the object of this invention is to propose a sliding roof device which is designed to close an opening made in the upper part of a motor vehicle body, the indicated sliding roof device having a pane which is movably mounted for displacement between a closed position in which the pane is suited for closing the opening, and an opened position in which the pane is suited to extending at least partially spaced away from the opening, this sliding roof device making it possible to avoid the problems in the prior art and especially with respect to practical use and ease of use to yield major improvements and at the same time to remain especially economical.

This object is achieved in accordance with this invention in that the movable pane, on the one hand, comprises a front part which is pivotally mounted relative to a transverse axis about which it is mounted to be able to turn or pivot for displacement in essentially translational motion, and on the other hand, a rear part which is pivotally mounted relative to a transverse axis about which it is mounted to be able to turn or pivot in the direction relative to a transverse stationary axis.

The invention defined in this way offers the advantage of offering kinematics which, on the one hand, are outstandingly compatible with a purely manual manner of operation, and at the same time, is able to ensure displacement of a movable pane between a flush closed position and an opened position with a reduced space requirement.

Compared to motor-driven systems according to the prior art, the structural simplicity of the invention makes the sliding roof device easy to operate and much more economical. Moreover, it offers considerable reliability within the framework of use for commercial vehicles.

This invention also relates to features which arise in the course of the following description and which should be examined in isolation or in their overall possible technical combinations.

This description which is given as a non-limiting example is designed to make it more easily understood what the invention is comprised of and how it can be implemented. It is described with reference to the accompanying drawings.

BRIEF DESCRIPTION OF THE DRAWINGS

FIGS. 7 to 10 are especially intended to explain the kinematics of the sliding roof device as shown in FIGS. 1 to 6;

DETAILED DESCRIPTION OF THE INVENTION

For reasons of clarity the same components are labeled with identical reference numbers. Likewise, only the elements important for understanding of the invention are shown, without being to scale, and in schematic form.

Figure 1:
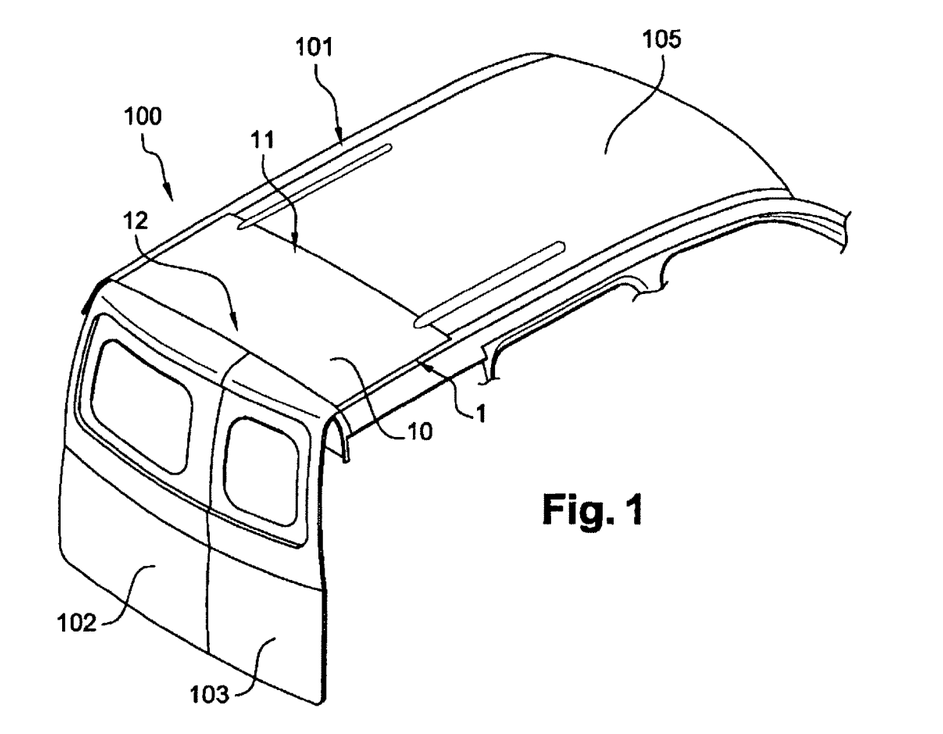
FIG. 1 is a perspective view of the top part of the body of a motor vehicle which is equipped with a sliding roof device in accordance with the invention, as seen from the rear with the roof device in the closed position.

FIG. 1 shows a motor vehicle 100, of which, in turn, likewise for reasons of clarity, only the upper part of the body 101 and the two rear double doors 102, 103 are shown.

Figure 2:
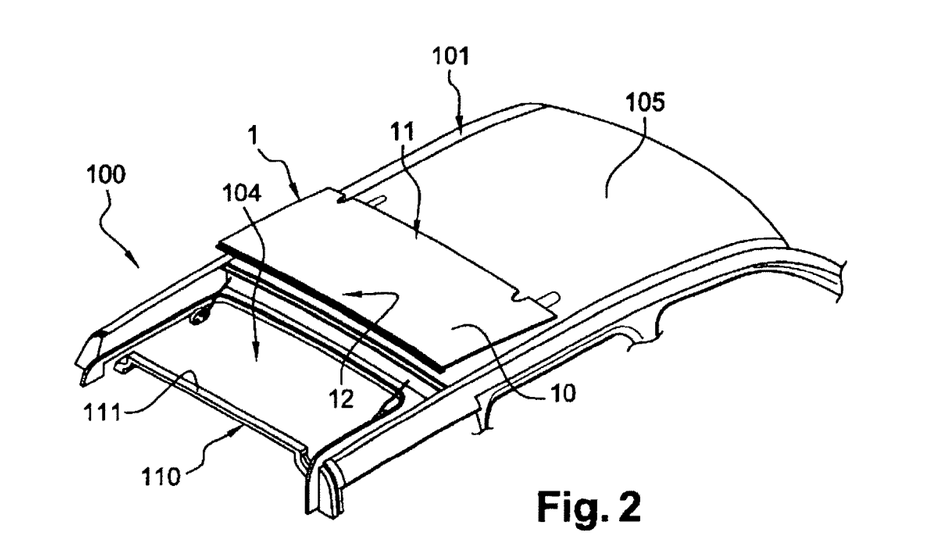
FIG. 2 is a perspective view analogous to FIG. 1, but with the sliding roof device shown in the opened position and the rear double doors removed.

As can be seen especially in FIG. 2, in the upper part of the body 101, here, in the lower part of the roof skin 105, an opening was made to accommodate the sliding roof device 1 in accordance with the invention.

The indicated sliding roof device 1 is provided with a pane 10 which is mounted to be able to move for displacement between a closed position (FIG. 1) and an opened position (FIG. 2). The whole is arranged such that the movable pane 10 is able to close the opening 104 in the closed position and such that the pane 10 extends spaced apart from the opening 104 in the opened position.

Figure 7:
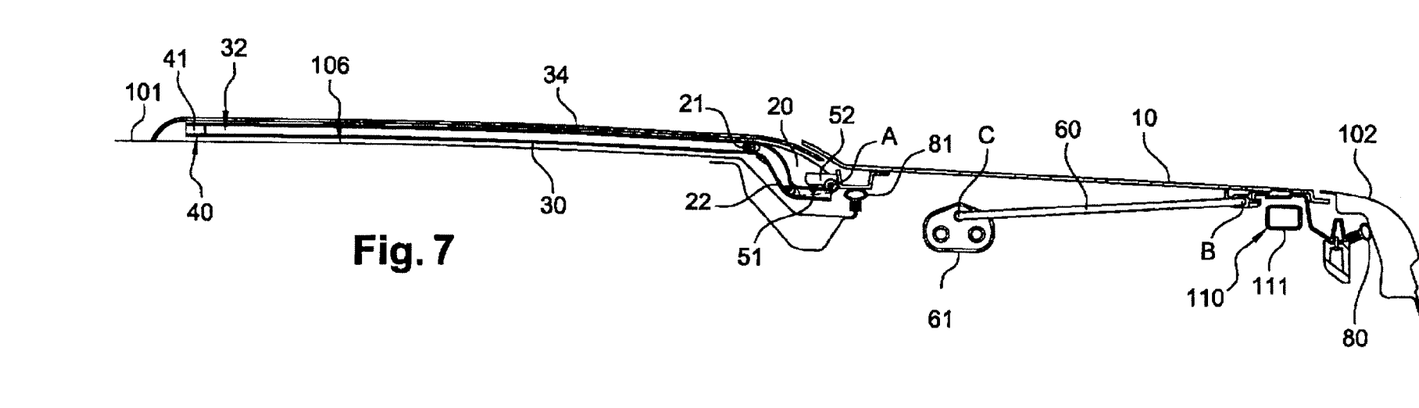
FIG. 7 is a lengthwise sectional view of the sliding roof device in the closed position, the indicated section having been made at the height of one of the side edges of the movable pane.
Figure 8:
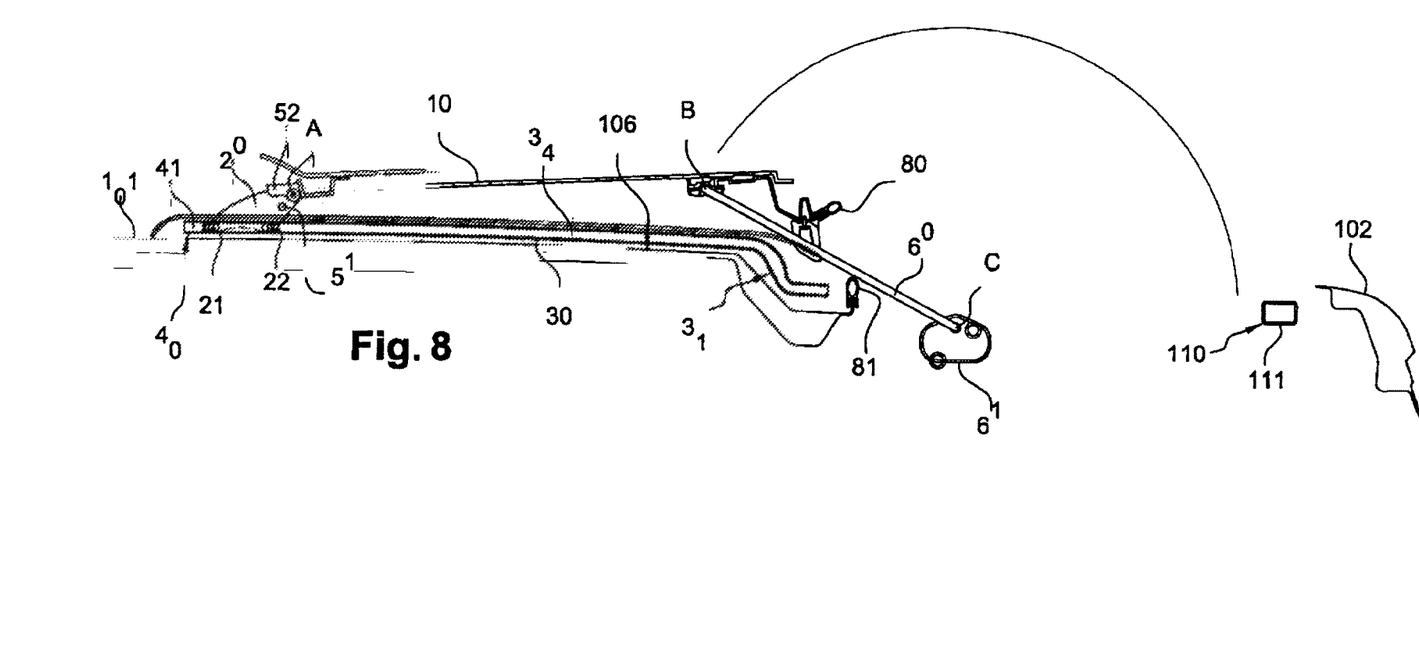
FIG. 8 is a view similar to FIG. 7, but with the sliding roof device being in the opened position.

According to the subject matter of this invention, the front part 11 of the movable pane 10 is mounted to be able to turn or pivot about an axis A (FIG. 7) which extends in the transverse direction of the roof and which is mounted able to move forward in a an essentially translation-like motion (compare FIGS. 7 & 8). Furthermore, the rear part 12 of the movable pane 10 is mounted to be able to turn or pivot relative about an axis B which extends in the transverse direction and is mounted to move in rotation relative to a fixed axis C.

In this special embodiment, which was selected simply as an example, the axis of rotation or the pivoting axis A of the front part 11 of the pane 10 and the axis of rotation or pivoting axis B of the rear part 12 of the pane 10 are both movably mounted for displacement in the directions which run essentially lengthwise relative to the upper part of the body 101. This means, in other words, that the pane 10, here, is preferably mounted to be able to move in the lengthwise direction along the rear part of the roof 105.

According to a currently preferred embodiment of the invention, the axis of rotation A of the front part 11 of the pane 10 is mounted to be able to move for displacement in a motion essentially parallel to the upper part of the body 101 of the motor vehicle 100.

In an especially advantageous manner, the whole is made such that the movable pane 10, in the closed position, is flush with the part of the upper part of the body 101 which borders the opening 104 (FIG. 1). This particular feature is of interest not only from a purely aesthetic standpoint, but also enables a reduction of wind noise.

According to another advantageous feature of the invention, the whole is made such that the movable pane 10 in the opened position extends above and essentially parallel to the upper part of the body 101 (FIG. 2). This particular feature imparts optimum compactness to the sliding roof device 1 when the latter is in the opened position. In fact, the pane 10 and the roof skin 105 are then located directly next to one another and extend essentially in the same direction.

Figure 10:
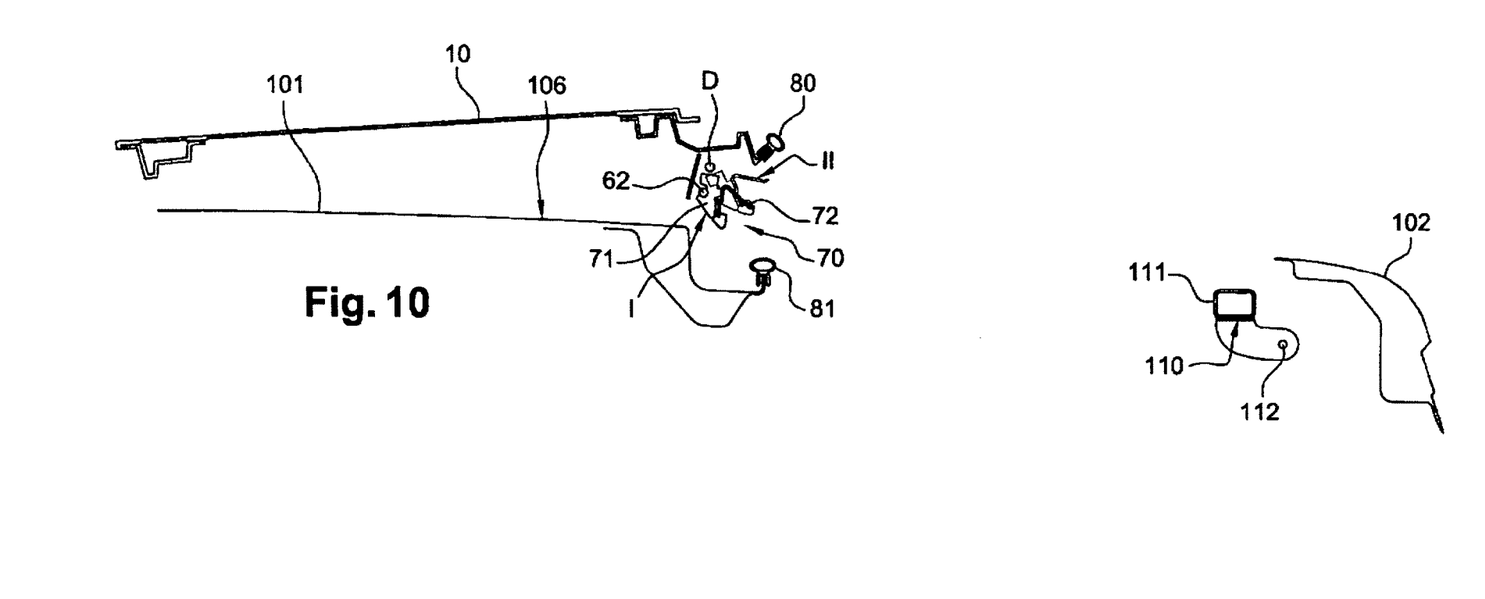
FIG. 10 is a view similar to FIG. 8, but with the sliding roof device in the opened position.

In this special configuration, the movable pane 10 is inclined downward in a forward direction in the opened position relative to the upper part of the body 101 (FIGS. 8 & 10). This feature is intended essentially to facilitate manual closing of the movable pane 10 proceeding from the opened position.

According to a particular aspect of the invention which is shown in FIGS. 3, 4, 7 & 8, the front part 11 of the pane 10 is coupled to at least one lever 20 which is able to slide in a guide rail 30 which is permanently joined to the upper part of the body 101.

In this embodiment, the mobility of the front part 11 of the pane 10 is in fact ensured by two levers 20 which slide in the lengthwise direction and which are otherwise mounted to be able to pivot or turn at the height of the respective side edge of the front part 11 of the pane 10 relative to the same axis A in the lengthwise direction.

Figure 3:
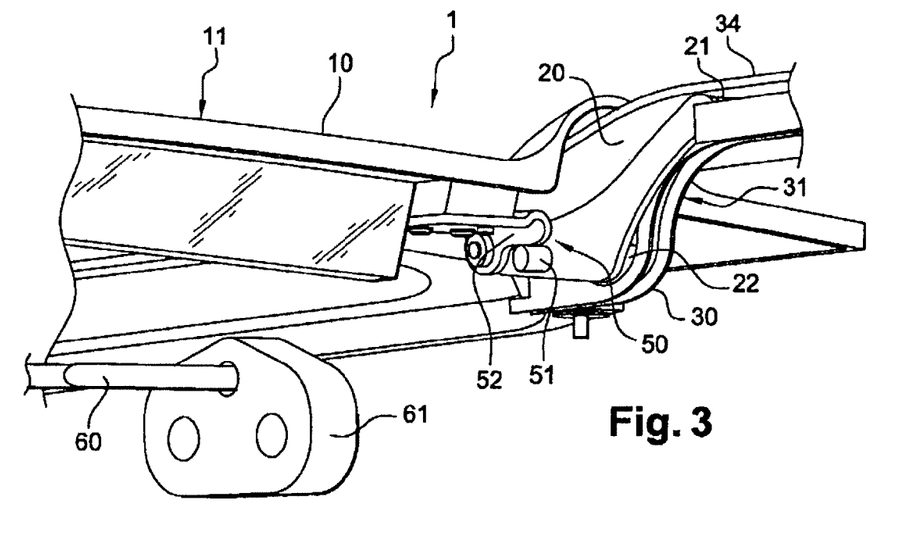
FIG. 3 shows in detail the mechanical connection between the front part of the movable pane and the upper part of the body when the sliding roof device is in the closed position.

Especially advantageously, each lever 20 in the lengthwise direction, i.e. therefore according to the direction in which it slides, is provided with at least one front sliding block 21 and at least one rear sliding block 22 which are able to slide independently of one another on the same guide rail 30 (FIGS. 3, 7 and 8).

The fact that the lever 20 has two separate sliding points imparts to it the ability to slide in a rail 30 which is not straight. This property is important when it is considered that the guidance of the front part 11 of the pane 10 proceeding from a closed position which is flush relative to the roof skin 105 as far as an open position which is far above the indicated roof skin 105 is necessary.

According to another advantageous feature of the invention, the front part 11 of the pane 10 is coupled to each lever 20 at the height of a point which is above the front sliding block 21 and the rear sliding block 22 (FIG. 8). This particular feature results in formation of a lever action which is suited to promoting the sliding of each lever 20 when the pane 10 is moved in the opening and/or closing direction.

Preferably, the front part 11 of the pane 10 is coupled to each lever 20 at the height of a point which is positioned to the rear relative to each rear sliding block 22 (FIG. 8).

According to another particular feature of the invention which is shown especially in FIGS. 3, 5, 7 and 8, each guide rail 30 is permanently connected to the outer surface 106 of the upper part of the body 101, but in the immediate vicinity of the opening 104 has an inclined part 31 which extends below the outside surface 106. The whole is otherwise made such that, in the closed position (FIG. 7), the inclined part 31 of the guide rail 30 is able to allow the corresponding lever 20 to tilt at least partially into the interior of the opening 104 in order to position the front axis of rotation A of the pane 10 below the part of the body 101 which borders the opening 104, and to position the front part 11 of the indicated pane 10 flush relative to the indicated part of the body 101 which borders the opening 104.

In practice, each guide rail 30 can be made, for example, from aluminum, steel, injection molded plastic material or extruded plastic material. It can be connected to the upper part of the body 101 by screws, rivets, adhesive or any other fastening technique.

In this embodiment, each guide rail 30 is connected to a cover 34 which is designed to visually hide the presence of the indicated guide rail 30 when the upper part of the body 101 is viewed from the side; this improves aesthetics.

According to another special feature of the invention, the sliding roof device 1 is provided with first stop means 40 which are able to block the forward movement of the pane 10 when the latter reaches the opened position. This feature makes it possible to guarantee blocking of the pane 10 in the opened position when force is applied to it in the forward direction, especially by the locking means 70 which act on the rear part 12 of the pane 10.

Especially advantageously, the first stop means 40 comprise at least one buffer block 41 which is able to block the forward sliding of the lever 20 in its guide rail 30 when the pane 10 has reached the opened position.

Figure 4:
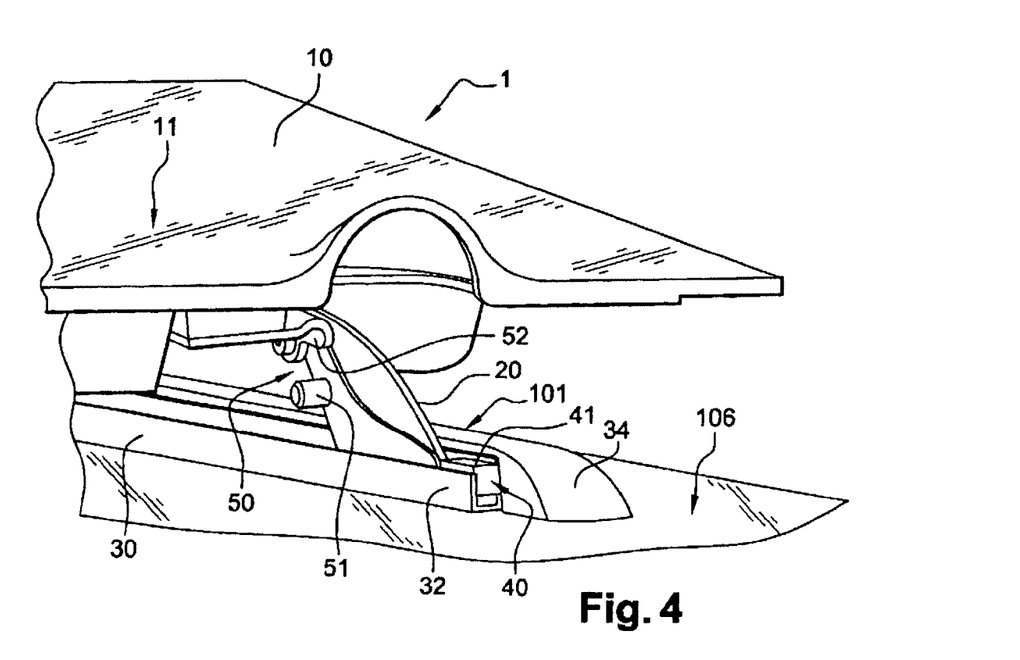
FIG. 4 shows in detail the mechanical connection shown in FIG. 3 when the sliding roof device is in the opened position.

As is shown in FIGS. 4, 7 and 8, in this special embodiment, two buffer blocks 41 are permanently joined on the respective front ends 32 of the two guide rails 30. The purpose is to jointly block the sliding motion in the lengthwise direction of the two levers 20 which bear the front part 11 of the movable pane 10.

Figure 11:
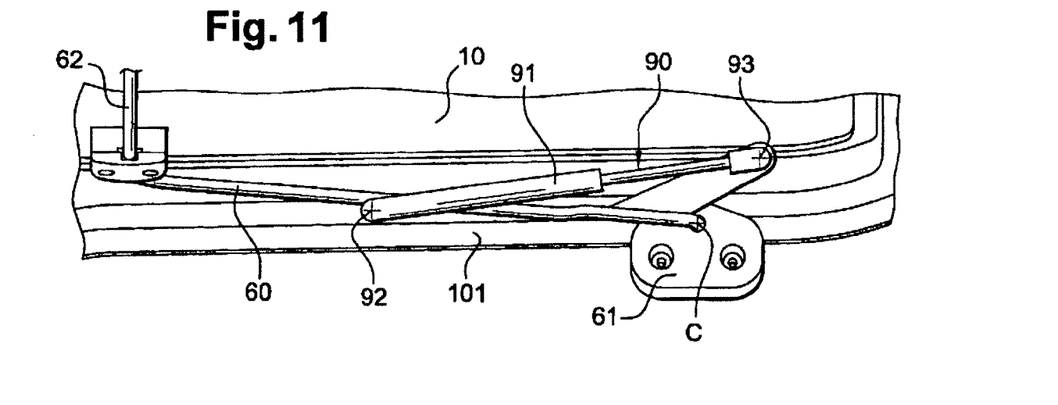
FIG. 11 shows support means which are designed to facilitate the use of the sliding roof device and which correspond to a first configuration of the invention, the sliding roof device being shown in the closed position.

According to another particular feature of the invention, the sliding roof device 1 is provided with second stop means 50 which are able to block rotation or pivoting of the pane 10 relative to the axis A up when the indicated pane 10 is located essentially in the closed position (FIG. 11). This feature enables, to a certain extent, a temporarily secure connection of the lever 20 to the pane 10 at the start of the opening phase or at the end of the closing phase. Accordingly, this enables passage of each sliding lever 20 between the inclined part 31 and the linear part of its guide rail 30, i.e., the one which extends in the upper part of the body 101.

In an especially advantageous manner, the second stop means 50 have at least one first projecting element 51 which is securely joined to the lever 20 and at least one second projecting element 52 which is securely joined to the pane 10. The whole is made such that the first projecting element 51 is able to be supported against the second projecting element 52 when the pane 10 is essentially in the closed position.

As can be seen especially in FIGS. 3 and 4, each lever 20 here is provided with a first projecting element 51 which has the form of a pin which extends in the transverse direction toward its counterpart. The pane 10, for its part, is provided with two second projecting elements 52 in the form of fingers which extend lengthwise forward and which engage the projecting element in the closed position shown in FIG. 3.

According to another special feature of the invention, the rear part 12 of the pane 10 is coupled to the end of at least one guide arm 60 which is able to turn or pivot around a fixed axis C which is securely connected directly to the body 101 in a plane which is essentially perpendicular to the rear axis of rotation B of the indicated pane 10.

In this embodiment, the mobility of the rear part 12 of the pane 10 is in fact ensured by two guide arms 60 which are mounted to be able to turn or pivot on their lower ends in the lengthwise direction relative to the body 101 around the fixed axis C and on their upper ends are mounted to be able to turn or pivot in the lengthwise direction at the height of the two side edges of the indicated rear part 12 of the pane 10 relative to the same axis B.

Figure 5:
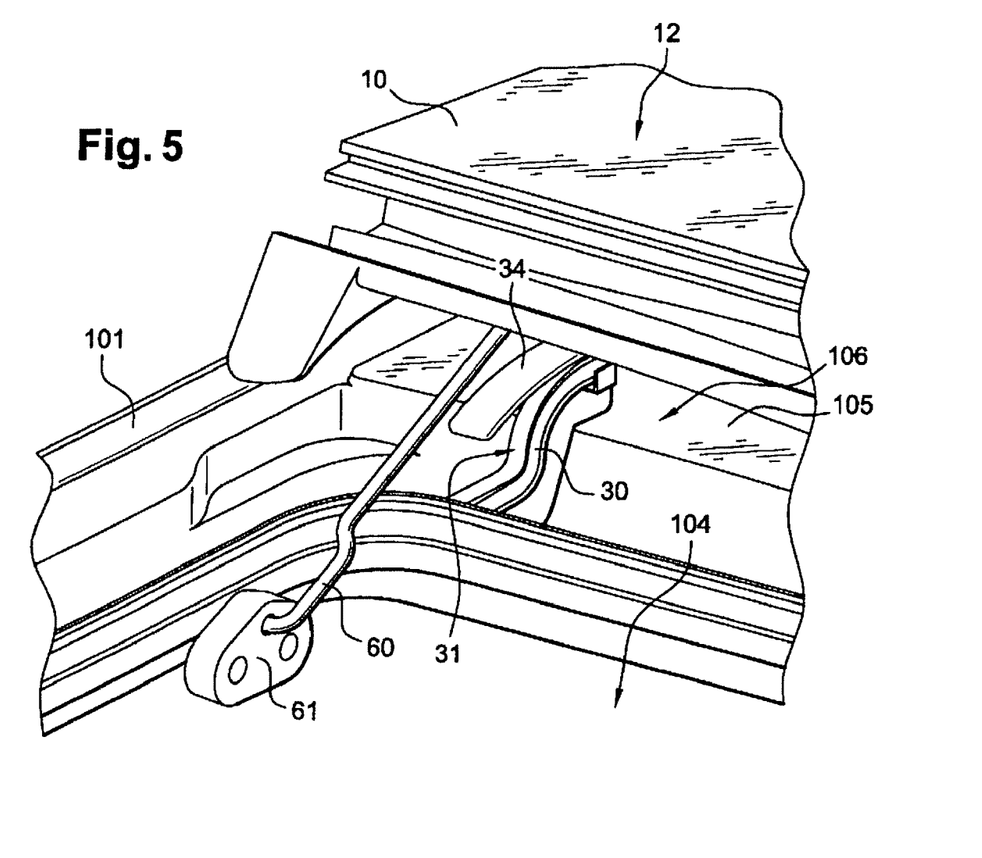
FIG. 5 shows in detail the mechanical connection between the rear part of the movable pane with the upper part of the body when the sliding roof device is in the opened position.

As can be seen in FIGS. 3 and 5, each guide arm 60, at the height of the body 101, is mounted to be able to turn via a bearing 61 which is permanently connected to the edge which borders the opening 104 by means of two fastening screws (not shown).

In an especially advantageous manner, each guide arm 60 is coupled, relative to the body 101, to a point which is located directly on the opening 104 (FIGS. 7 and 8).

According to another advantageous feature of the invention, the rear part 12 of the pane 10 is coupled to the end of two guide arms 60 which are each positioned at the height of the two side edges of the indicated rear part 12 and are otherwise securely joined to one another. It goes without saying that the two guide arms 60 can be part of the same workpiece or can be securely joined to one another via at least one connecting piece.

Figure 6:
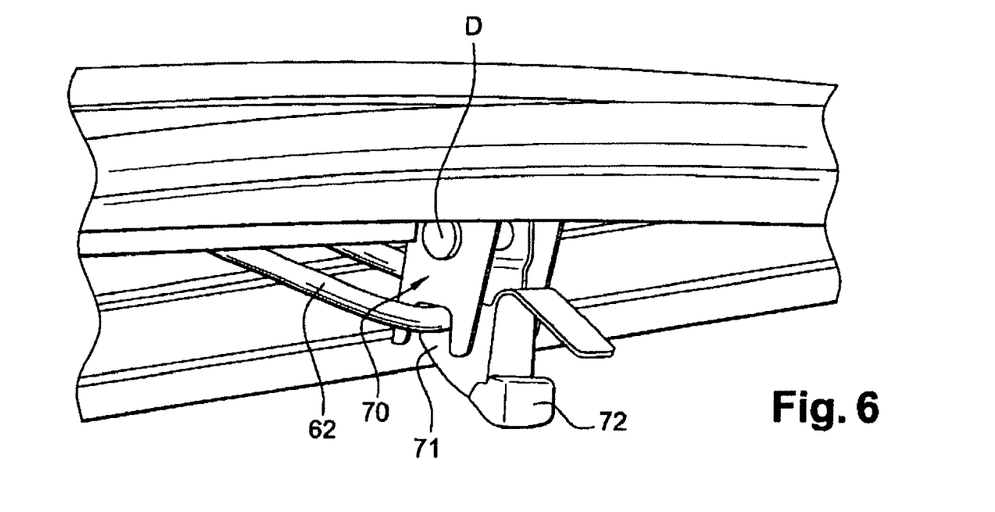
FIG. 6 shows locking means which make it possible to secure the movable pane when the sliding roof device is in the opened position.
Figure 9:
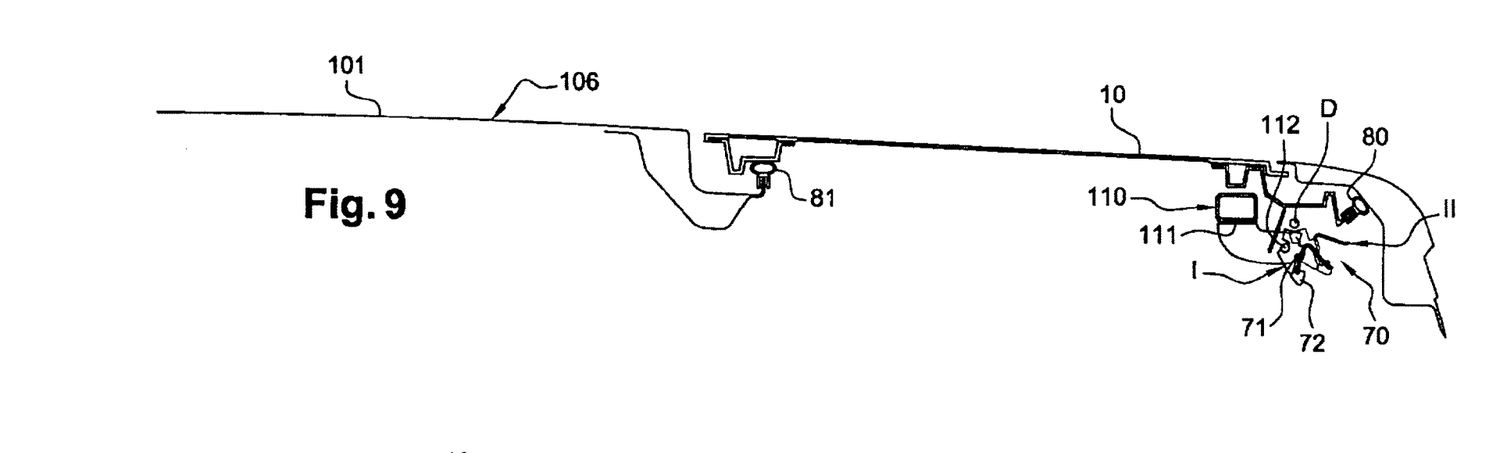
FIG. 9 is a sectional view of the sliding roof device in the closed position.

According to another particular feature of the invention which is shown this time in FIGS. 6, 9 and 10, the sliding roof device 1 also has locking means 70 which are permanently connected to the pane 10 and which are able to block the mobility of the pane 10 both in the opened and also in the closed positions.

In an especially advantageous manner, the locking means 70 in the closed position is able to reversibly hook into a structural element 110 of the upper part of the body 101 (FIG. 9). In this embodiment, the structural element 110 advantageously is formed of a removable rod 111 which, in the conventional manner, is used as the upper anchoring point for the rear double doors 102, 103 of the motor vehicle 100. As the name indicates, this rod 111 is able to be dismounted to completely clear the cargo space of the vehicle 100 when the rear doors 102, 103 have likewise been removed.

As can be seen in FIG. 6, the locking means 70, in the opened position, are advantageously able to be reversibly hooked into the part 62 which connects the two guide arms 60 to one another, its being clear that the rear part 12 of the pane 10 here is coupled to the end of the two guide arms 60 which are securely joined to one another. As was already stated above, the part 62 can be formed by the central part of the same element with two ends forming guide arms 60, or by a connecting piece which connects the two independent guide arms 60 to one another.

In this embodiment, the locking means 70, in the conventional manner, consists of an anchoring hook 71 which is mounted to be able to pivot around an axis D in the lengthwise direction. The whole is arranged such that the anchoring hook 71 is able to be pushed between an active position (FIG. 6, position I of FIGS. 9 and 10) in which it is suited to being hooked at the anchoring point 62, 112, and a passive position (position II of FIGS. 9 and 10) in which it extends spaced apart from each anchoring point 62, 112. An elastic return means (not shown for reasons of clarity), is otherwise provided to entrain the anchoring hook 71 in the active position. Of course, the locking means 70, which are shown here by way of example, could be replaced by any other equivalent reversible hooking system.

According to another advantageous feature of the invention, the locking means 70 are provided with a workpiece which constitutes an operating handle 72 and which makes it possible to push the pane 10 during opening and pull it during closing.

According to another particular feature of the invention, the sliding roof device 1 can also have an air guide element which is positioned on the upper part of the body above the pane 10 when the latter is in the opened position. This feature is designed to suppress wind noise.

In this special embodiment which was chosen simply as an example, the sliding roof device 1 is inserted in the rear part of the roof skin 105 of the motor vehicle 100. It is, of course, quite possible to integrate it at any other location of the upper part of the body 101, especially forward. In exactly this case, the sliding roof device 1 is simply turned by 180° such that it forms a type of manual sliding roof.

FIGS. 7 to 10 make it possible to better understand the kinematics of the sliding roof device 1, as described above.

As can be seen in FIGS. 7 and 9, the pane 10 in the closed position is flush relative to the outer surface 106 of the upper part of the body 101. As shown in FIG. 9, the hook 71 of the locking means 70 engages a fastening finger 112 which is securely joined to the removable rod 111 so that the pane 10 is completely blocked.

Therefore, the opening phase begins by deactivation of the locking means 70 by the hook 71 being turned or pivoted from its active position I to its passive position II. When unlocking has taken place, a pushing force on the operating handle 72 up and in the direction which runs essentially lengthwise can be manually applied to induce movement of the pane 10.

Specifically, the rear part 12 of the pane 10 begins to be raised by swinging the guide arms 60 in the lengthwise direction of the vehicle (arc in FIG. 8). At almost the same time, the front part 11 of the pane 10 is also raised relative to the upper part of the body 101 because the levers 20 are entrained to slide forward in the inclined part 31 of the respective guide rail 30.

The latter process is promoted by the second stop means 50 which, in this stage of motion, advantageously blocks the swinging of the pane 10 upward about the axis A. According to FIG. 7, the support of the various projecting elements 51, 52 temporarily makes it possible to connect each lever 20 securely to the pane 10. The lifting of the rear part 12 of the pane 10 therefore results directly in the alignment of the levers 20. However, since the levers 20 are mounted to slide in the guide rails 30 with a suitable profile, this in fact results in the action of facilitating the transition of each of the sliding levers 20 from the inclined parts 31 of their guide rail 30 to the part which extends over the upper part of the body 101.

The pane 10 continues to be extended therefore by a combination of two movements of displacement, i.e., translation in the lengthwise direction for the front part 11 and rotation around the transverse axis with respect to the rear part 12. It is noted that the rotation of the pane 10 relative to the axis A passes through a peak when the axis of rotation B of the rear part 12 traverses its maximum stroke which is vertical relative to the axis C.

According to FIGS. 8 and 10, the opened position is reached when the levers 20 come into contact with the buffer blocks 41 which are securely connected to one another on the front ends 32 of the two guide rails 30. The pane 10 can then be blocked in this position by the locking means 70 being inserted again. For this purpose, the hook 71 is inserted into the part 62 which connects the two guide arms 60 to one another.

The pane 10 logically closes according to the reverse kinematics.

FIGS. 7 to 10 likewise show the presence of seals 80, 81 which are designed to ensure tightness between the pane 10 and the part of the body 101 in which the opening 104 has been made.

According to another particular feature of the invention, the sliding roof device 1 can advantageously have support means 90 (FIGS. 11-15) which are able to compensate for the weight of the pane 10 in its transfer between the closed position and the opened position.

Transfer between the closed position and the opened position is defined as any movement of the pane 10 from the closed position to the opened position and/or from the opened position to the closed position. Regardless of this, this feature facilitated mobility of the pane 10, especially at the instant at which the rear part 12 of the indicated pane 10 is raised to its maximum height, by rotation in the lengthwise direction of the guide arm 60.

Figure 12:
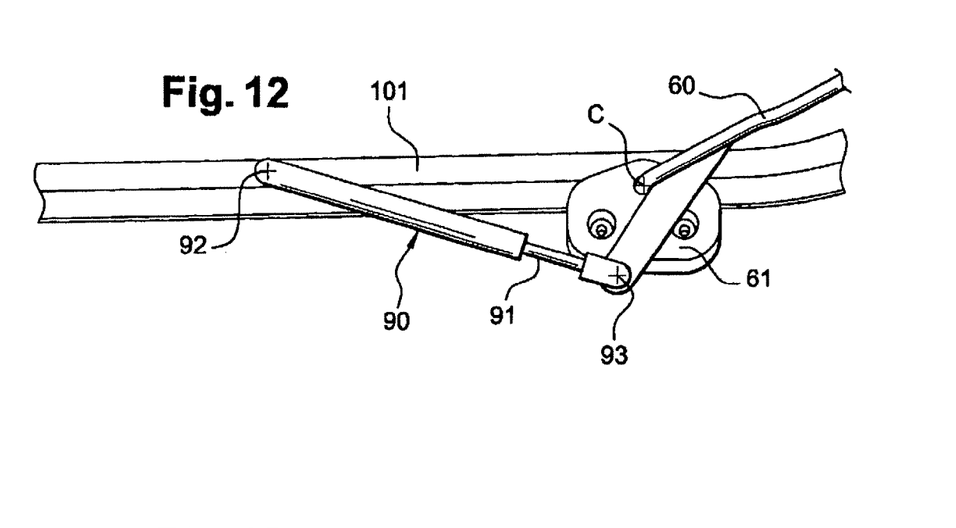
FIG. 12 is a view similar to FIG. 11, but the sliding roof device being in the opened position.

According to the first embodiment shown in FIGS. 11 and 12, the support means 90 are provided at least with one elastic return means 91 which is active in compression and which develops its action between a first anchoring point 92 which is securely joined to the upper part of the body 101 and a second anchoring point 93 which is securely joined to the guide arm 60. The whole is made such that the second anchoring point 93 is positioned opposite the rear axis of rotation B of the pane 10 relative to the axis of rotation C of the guide arm 60.

The fact that the second anchoring point 93 is opposite the axis B relative to the axis C, simply means that it is positioned essentially in a diametrically opposite manner to the axis B relative to the axis C without the distance separating it from the indicated axis C being unconditionally equal to the distance which separates the axes B and C.

This embodiment enables entrainment of the pane 10 in the direction to the opened position at the start of the opening phase, but also in the direction to the closed position at the start of the closing phase. This conversely means that it is also able to damp the lowering of the pane 10 at the end of the opening phase and at the end of the closing phase. This system is in fact active only on either side of a neutral position which is characterized in that the two anchoring points 92, 93 of the elastic return means 91 are then located flush with the axis of rotation C.

In this special embodiment as shown in FIGS. 11 and 12, each guide arm 60 is connected to an elastic return means 91. Moreover, the elastic return means 91 has the form of a gas spring which is active in compression in a conventional manner.

Figure 13:
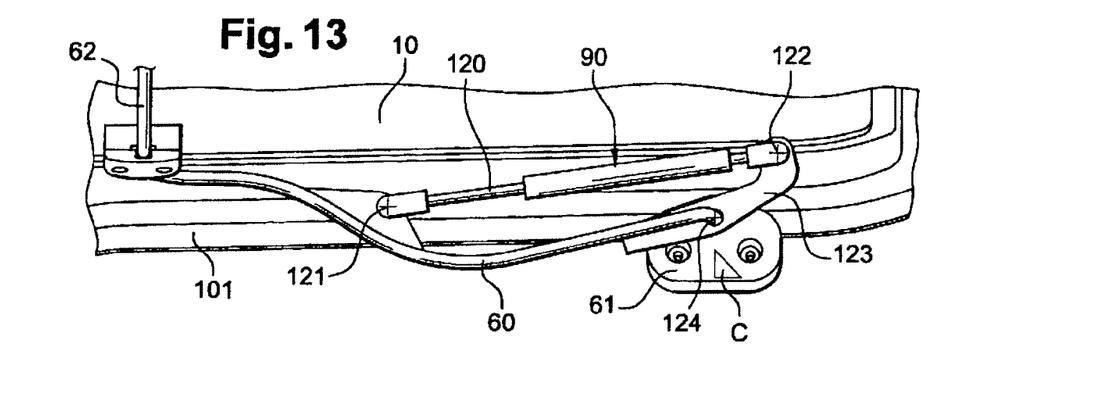
FIG. 13 shows supports means according to a second configuration of the invention, the sliding roof device being shown in the closed position.
Figure 14:
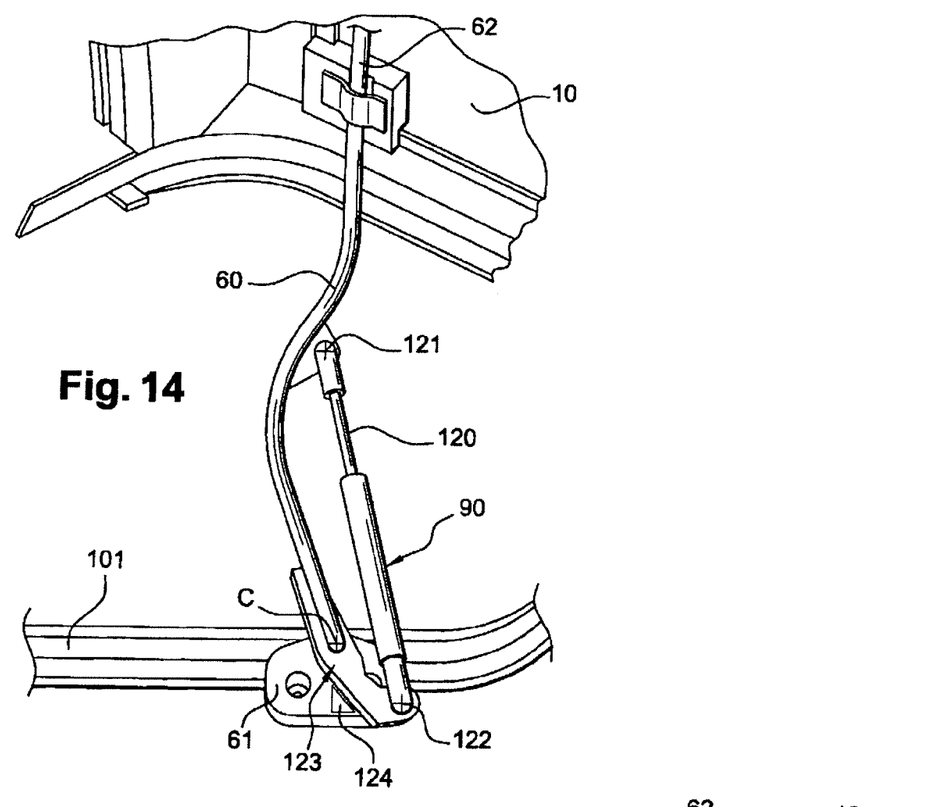
FIG. 14 is a view similar to FIG. 13, but with the sliding roof device being in the course of opening.
Figure 15:
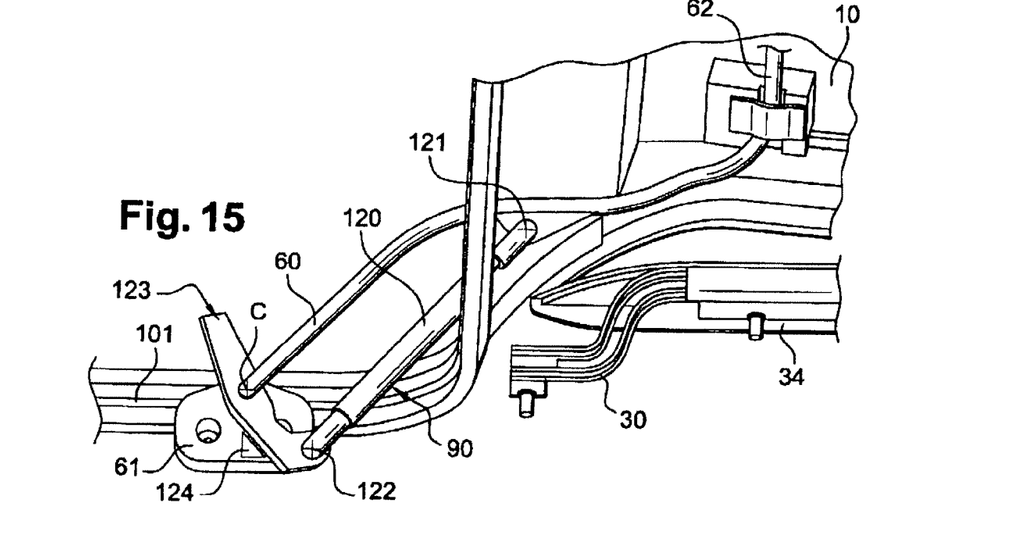
FIG. 15 shows a view similar to FIGS. 13 and 14, but with the sliding roof device being in the opened position.

In a second embodiment, which is shown this time in FIGS. 13 to 15, the support means 90 are provided with at least one elastic return means 120 which is active in compression and which applies its action between a first anchoring point 121 which is connected to the guide arm 60 and a second anchoring point 122 which is securely connected to a connecting lever 123 which is mounted to be able to turn or pivot around the axis of rotation C of the indicated guide arm 60. Under this assumption the anchoring point 122 is arranged opposite the axis B relative to the axis C.

The whole is, first of all, made such that the connecting lever 123 is able to remain stopped essentially in extension in the lengthwise direction of the guide arm 60 when the rear axis of rotation B of the pane 10 is located between its closed position and the vertical relative to the axis of rotation C. The whole is otherwise made such that the connecting lever 123 is also able to interact by contact with the stop 124 which is securely connected to the upper part of the body 101 when the axis of rotation B moves between the vertical relative to the axis of rotation C and the opened position. The whole is moreover arranged such that supporting the connecting lever 123 against the stop 124 causes compression of the elastic return means 120.

This embodiment makes it possible to entrain the pane 10 for displacement only in the direction to the opened position, exclusively at the end of the opening phase. The compensation function remains in fact inactive during the entire phase, while the connecting lever 123 remains stopped against the guide arm 60.

In the special embodiment as shown in FIGS. 13 to 15, each guide arm 60 is connected to an elastic return means 120. In the same manner as in the first embodiment, the elastic return means 120 has the form of a gas spring which is active in compression in a conventional manner.

Of course, the invention in general relates to any motor vehicle which has at least one sliding roof device 1 as described above.

What is claimed is:

1. Sliding roof device for closing a roof opening in an upper part of a body of a motor vehicle, comprising:

a pane which is movably mounted for displacement between a closed position in which the pane closes the roof opening, and an opened position in which the pane is at least partially spaced away from the roof opening, wherein the movable pane has a front part which is connected to a first lever arm that is mounted to pivot out of a position within the roof opening around a transversely extending pivot axis which is mounted for essentially translational displacement along a portion of a roof surface in a longitudinal direction of the motor vehicle away from the roof opening in an installed state of the device in the motor vehicle, and wherein the movable pane has a rear part which is connected to a second lever arm that is pivotally mounted at a fixed transverse rear axis of rotation and is mounted to swing about a stationary axis that extends in a transverse direction from a position within the roof opening in a closed position of the cover, past a top dead center position, to a position extending above said portion of the roof surface.

2. Sliding roof device as claimed in claim 1, wherein the axis of rotation of the front part of the pane is mounted to move essentially parallel to the upper part of the body.

3. Sliding roof device as claimed in claim 1, wherein the movable pane is flush with part of the upper part of the body which borders the roof opening in the closed position.

4. Sliding roof device as claimed in claim 1, wherein the movable pane extends above and essentially parallel to the upper part of the body in the opened position.

5. Sliding roof device as claimed in claim 1, wherein the movable pane is inclined downward in a forward direction relative to the upper part of the body in the opened position.

6. Sliding roof device as claimed in claim 1, wherein the front part of the pane is coupled to at least one first lever arm which slides in a guide rail which is permanently joined to the upper part of the body.

7. Sliding roof device as claimed in claim 6, wherein said at least one first lever arm has at least one front sliding block and at least one rear sliding block which are mounted to slide independently of one another on the same guide rail.

8. Sliding roof device as claimed in claim 6, wherein the front part of the pane is coupled to said at least one first lever arm at a height which is above the front sliding block and the rear sliding block.

9. Sliding roof device as claimed in claim 6, wherein the front part of the pane is coupled to said at least one first lever arm at a point which is positioned to the rear relative to each rear sliding block.

10. Sliding roof device as claimed in claim 6, wherein each guide rail is permanently connected to an outer surface of the upper part of the body and in the immediate vicinity of the roof opening, wherein each guide rail has an inclined part which extends below said outer surface, and wherein the inclined part tilts the respective first lever arm at least partially into the interior of the opening in the closed position to position the front axis of rotation of the pane below the part of the body which borders the roof opening and positions the front part of the pane flush relative to the part of the body which borders the opening.

11. Sliding roof device as claimed in claim 1, further comprising a first stop means for blocking forward movement of the pane when the pane reaches the opened position.

12. Sliding roof device as claimed in claim 11, wherein the front part of the pane is coupled to said first lever arm which slides in a guide rail which is permanently joined to the upper part of the body; and wherein the first stop means comprise at least one buffer block which blocks forward sliding of the first lever arm in the respective guide rail when the pane has reached the opened position.

13. Sliding roof device as claimed in claim 11, further comprising second stop means for blocking upward rotation of the pane relative about the pivot axis for the front part when the pane is essentially located in the closed position.

14. Sliding roof device as claimed in claim 13, wherein the front part of the pane is coupled to at least one first lever arm which slides in a guide rail which is permanently joined to the upper part of the body, wherein the second stop means have at least one first projecting element which is securely joined to the at least one first lever arm and at least one second projecting element which is securely joined to the pane, each first projecting element being supported against a second projecting element when the pane is essentially in the closed position.

15. Sliding roof device as claimed in claim 1, wherein the rear part of the pane is coupled to an end of at least one second lever arm which rotates about said stationary axis, said stationary axis extending essentially perpendicular to a plane in which the rear part of the pane is swung.

16. Sliding roof device as claimed in claim 15, wherein each second lever arm is coupled to the body at a point which is located directly at the roof opening.

17. Sliding roof device as claimed in claim 15, wherein the rear part of the pane is coupled to the end of two second lever arms at two side edges of the rear part and are securely joined to one another.

18. Sliding roof device as claimed in claim 1, further comprising locking means permanently connected to the pane for blocking movement of the pane both in the opened and in the closed position.

19. Sliding roof device as claimed in claim 18, wherein the locking means reversibly hook into a structural element of the upper part of the body in the closed position.

20. Sliding roof device as claimed in claim 18, wherein the rear part of the pane is coupled to the end of two second lever arms at two side edges of the rear part and are securely joined to one another, wherein the guide arms are securely joined to one another by a connecting part, wherein the rear part of the panel is coupled to the end of the second lever arms, and wherein the locking means reversibly hook into the connecting part.

21. Sliding roof device as claimed in claim 18, wherein the locking means have an operating handle for pushing the pane during opening and for pulling the pane during closing.

22. Sliding roof device as claimed in claim 1, further comprising support means for compensating for the weight of the pane as the pane is transferred between the closed position and the opened position.

23. Sliding roof device as claimed in claim 22, wherein the rear part of the pane is coupled to an end of at least one second lever arm which rotates about said stationary axis, wherein the support means comprise at least with one elastic return means which is active in compression and which acts between a first anchoring point which is securely joined to the upper part of the body and a second anchoring point which is securely joined to the second lever arm, the second anchoring point being positioned opposite the rear axis of rotation of the pane relative to the stationary axis of rotation of the second lever arm.

24. Sliding roof device as claimed in claim 22, wherein the rear part of the pane is coupled to an end of at least one second lever arm which rotates about said stationary axis, wherein the support means are provided with at least one elastic return means which is active in compression and which acts between a first anchoring point which is connected to the second lever arm and a second anchoring point which is securely connected to a connecting lever which is mounted to turn around the stationary axis of rotation of the second lever arm, the second anchoring point being positioned opposite the rear axis of rotation of the pane relative to the stationary axis, the connecting lever being able to remain stopped essentially in extension in the lengthwise direction of the second lever arm when the rear axis of rotation of the pane is between the closed position and a top dead center position with respect to the stationary axis and by contact interacts with a stop which is securely connected to the upper part of the body when the rear axis of rotation moves between the top dead center position and the opened position, supporting of the connecting lever against the stop causing compression of the elastic return means.

25. Motor vehicle having body having a roof with an upper roof part and with lower roof part having a roof opening and a sliding roof device for closing the roof opening, the sliding roof device comprising:

a pane which is movably mounted for displacement between a closed position in which the pane closes the roof opening, and an opened position in which the pane is at least partially spaced away from the roof opening to a position raised above the upper roof part, wherein the movable pane has a front part which is connected to a first lever arm that is mounted to pivot out of a position within the roof opening around a transversely extending pivot axis which is mounted for essentially translational displacement along the upper roof part in a longitudinal direction of the motor vehicle away from the roof opening, and wherein the movable pane has a rear part which is connected to a second lever arm that is pivotally mounted at a fixed transverse rear axis of rotation and is mounted to swing about a stationary axis that extends in a transverse direction from a position within the roof opening in a closed position of the cover, past a top dead center position, to a position extending above said portion of the roof part.

* * * * *